R. S. O'NEIL.
ELECTRICAL SIGNALING AND INDICATING DEVICE FOR SHIPS AND OTHER VESSELS.
APPLICATION FILED OCT. 27, 1920.

1,389,895.

Patented Sept. 6, 1921.

R. S. O'NEIL.
ELECTRICAL SIGNALING AND INDICATING DEVICE FOR SHIPS AND OTHER VESSELS.
APPLICATION FILED OCT. 27, 1920.

1,389,895.

Patented Sept. 6, 1921.
4 SHEETS—SHEET 2.

R. S. O'NEIL.
ELECTRICAL SIGNALING AND INDICATING DEVICE FOR SHIPS AND OTHER VESSELS.
APPLICATION FILED OCT. 27, 1920.
1,389,895.
Patented Sept. 6, 1921.
4 SHEETS—SHEET 3.
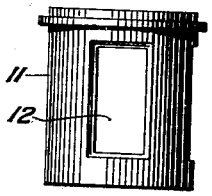
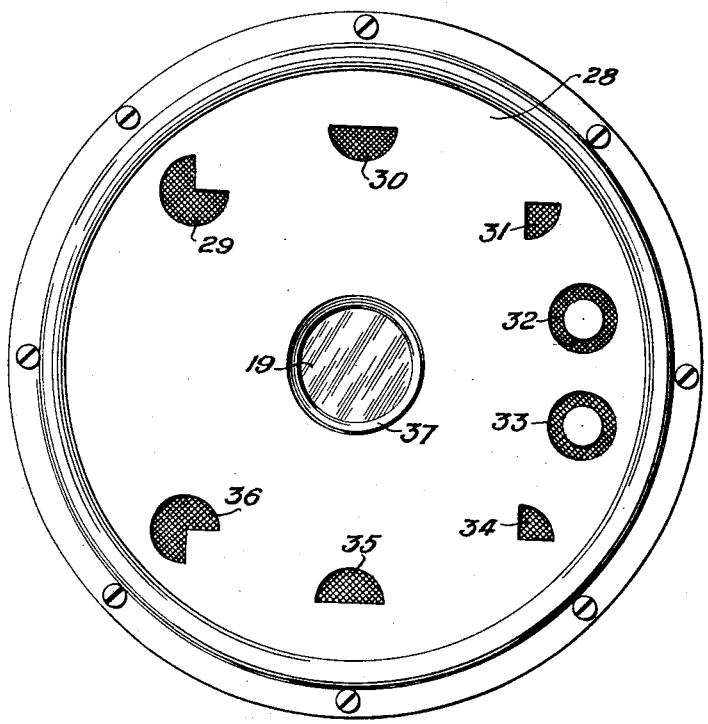

R. S. O'NEIL.
ELECTRICAL SIGNALING AND INDICATING DEVICE FOR SHIPS AND OTHER VESSELS.
APPLICATION FILED OCT. 27, 1920.

1,389,895.

Patented Sept. 6, 1921.
4 SHEETS—SHEET 4.

UNITED STATES PATENT OFFICE.

RODOLPH STUART O'NEIL, OF LONDON, ENGLAND, ASSIGNOR TO O'NEIL'S RECORDER SYNDICATE LIMITED, OF LONDON, ENGLAND.

ELECTRICAL SIGNALING AND INDICATING DEVICE FOR SHIPS AND OTHER VESSELS.

1,389,895.  Specification of Letters Patent.  Patented Sept. 6, 1921.

Application filed October 27, 1920. Serial No. 419,845.

*To all whom it may concern:*

Be it known that I, RODOLPH STUART O'NEIL, a subject of the King of Great Britain, residing at 57 Gracechurch Street, London, England, have invented certain new and useful Improvements in Electrical Signaling and Indicating Devices for Ships and other Vessels, of which the following is a specification.

The present invention relates to electrical signaling and indicating devices for ships and other vessels, and in particular refers to an indicator case containing a number of electric lamps, adapted to be illuminated in differing orders of succession in accordance with movements given to some member or mechanism located on a vessel (such for instance as the movements of a rudder), the light rays from the lamps being caused to pass through apertures in a dial and so as to give visual signals by the light rays passing through such apertures, or equivalently passing through transparent or translucent coverings of such apertures.

According to the present invention, the indicator case is fitted with a dial having a principal aperture or transparent portion, the illumination of which from the interior of the case serves to indicate general purpose or direction; and the dial has a plurality of subsidiary apertures or transparent portions, the illumination of each of which indicates some specific particular. Located within the case and beneath the principal dial aperture is a reflector chamber structure, the latter having a plurality of lateral windows each glazed with transparent material of different colors; each window communicates with one of a plurality of otherwise closed cells constructed within said indicator case, the said cells containing electric lamps, the rays from one or other of which, as they are illuminated, will pass by reflection and illuminate the principal aperture of the dial in accordance with the color of the window of the reflector chamber through which the light rays pass. A plurality of subsidiary cells are constructed within the case, each containing a lamp, and each cell having an aperture covered by glass of a desired color and located beneath one of the subsidiary apertures or transparent portions of the dial devoted to particular direction. By such a construction of indicator case general direction is indicated by reflection through the principal aperture of the dial, and particular direction is indicated by light rays passing through one or other of the subsidiary apertures of the dial devoted to particular direction.

In utilizing the indicator case for the purpose of showing the positions of the rudder of a vessel, the illumination of the lamps within the case is controlled by the movement of the rudder, and the color of the reflected light appearing in the principal aperture of the dial would indicate central direction or port or starboard, while the illumination of the subsidiary apertures of the dial, by which particular direction is to be indicated, show, according to the order of their illumination, the angle of the rudder relative to such general direction, which latter is shown by the principal aperture of the dial.

It is to be observed among other advantageous features of construction which will be described hereafter with reference to a particular example of construction, that signals in varying colors may be given by the light rays from electric lamps of clear glass, which in itself is an advantage since it is difficult to obtain electric lamp bulbs of glass of the requisite colors.

The invention further refers to the construction of the parts as hereafter described, which permits of easy and economical repetition of manufacture and assemblage, and which also permits of electric lamps being inserted or removed, without entirely dismantling the case and without disturbance of the connections of the electrical conductors.

The invention will now be further described with reference to the accompanying drawings, on which Figure 1 is a plan view of the indicator case with the dial removed, and Fig. 2 is a sectional front elevation with the dial in position, taken on the line 2—2 of Fig. 1.

Fig. 5 shows an elevation of the structure of the reflector chamber detached.

Fig. 6 is a plan view of the complete indicator case showing the dial constructed to exhibit a series of signs to indicate particular direction and a principal aperture to indicate general direction.

Figure 1:
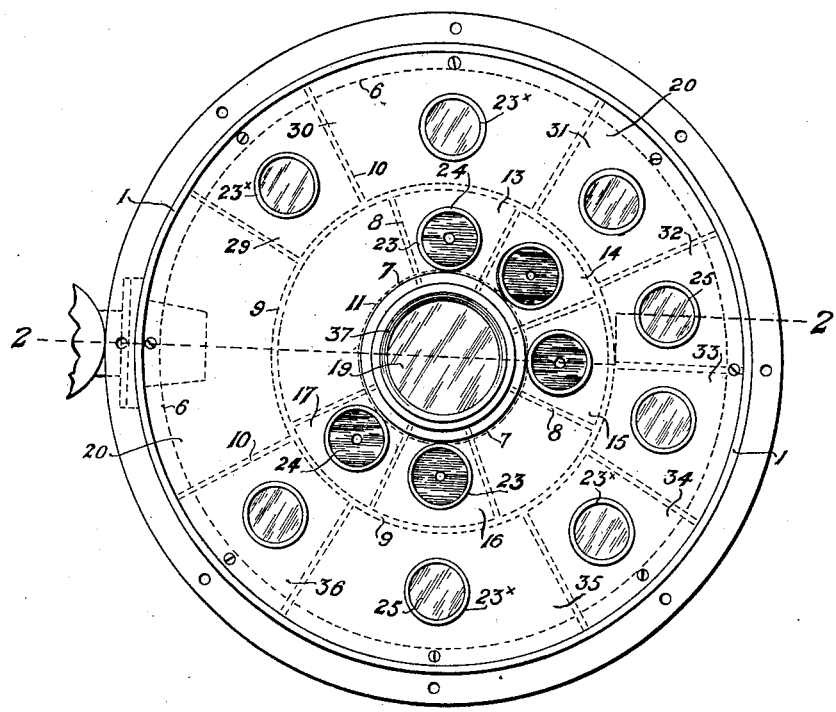
Figure 2:
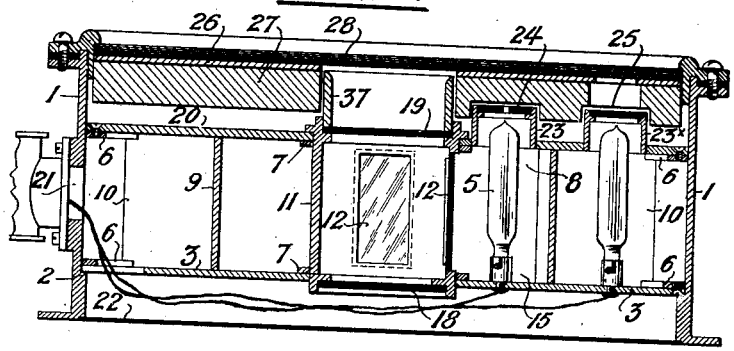

Referring to Figs. 1 to 6 of the accompanying drawings, an open-ended cylindrical case 1 is shouldered internally at 2, Fig. 2, to receive a circular lower cover plate 3 which is inserted through the open top of the case 1 and rests upon the shoulder 2; this lower plate 3 is formed with a number of holes in requisite positions in each of which is fixed by soldering or otherwise a socket 4 to receive an electric lamp 5, the fitting of which can be easily applied to or removed from the socket 4 in any well known manner, such as by means of a bayonet joint attachment.

Figure 3:
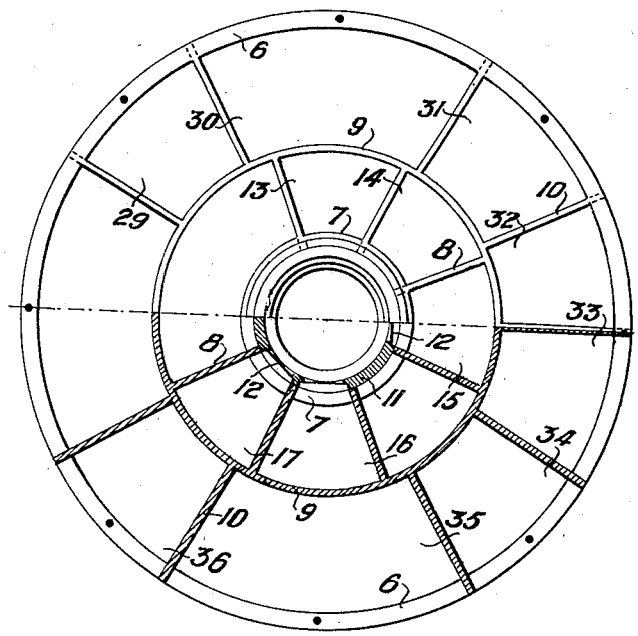
Fig. 3 is a plan view half in section of the partitioned frame detached from the case.
Figure 4:
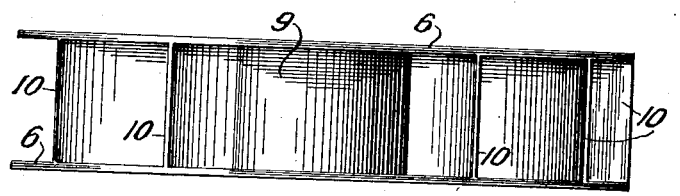
Fig. 4 is a front elevation of same.

Above the lamp carrying lower plate 3 a partitioned frame is inserted into and fits the case 1, the frame being separately shown at Figs. 3 and 4, from which illustrations it will be seen that a convenient construction consists in forming the frame with an upper and a lower outer ring 6 and an upper and a lower inner ring 7; the upper and lower inner rings 7 are connected by vertical radial partitions 8 to an outer annular vertical solid partition 9, and the latter annular partition 9 is connected by outer vertical radial solid partitions 10 with the upper and lower outer rings 6.

Fitting within the inner rings 7 of the frame, Fig. 3, is a reflector chamber structure 11 shown in half horizontal section at Fig. 3, in detached elevation at Fig. 5, and in vertical section at Fig. 2.

The reflector chamber structure 11, Fig. 5, is formed with a number of apertures through its cylindrical wall constituting windows 12, each of which latter is fitted with a glass cover, and the glass of one window 12 may be of a different color to the glass of another window; in the example shown, referring to Fig. 3, the windows 12 of the reflector structure 11 are arranged opposite to the cells 13, 14, 15, 16 and 17, so that the light rays of lamps, such as 5, located in the said cells will pass through the windows of the reflector structure, the base of which is closed by any suitable reflector plate, such as 18 Fig. 2, while the upper part of the structure 11 is fitted with preferably an opal glass cover 19. An upper cover 20 say of metal is then fitted into the case 1 and rests upon the upper edges of the partitioned frame and fits around the periphery of the reflector structure 11 which is inserted into position after the upper cover 20 has been applied, and the said upper cover 20 is fixed around its edges to the upper outer ring 6, and the lower outer ring 6 of the partitioned frame is fixed by screws to the lower plate 3. These parts having been placed in position, the electric conducting wires are inserted through a hole 21 in the side of the case as shown at Fig. 2, and respectively connected to the contact points of the sockets 4 beneath the cover plate 3, after which a bottom plate 22, is fixed in position by soldering or otherwise.

The upper cover 20 is formed with holes, one above each of the cells into which a lamp is to be fitted, and into such holes nozzles 23, 23$^\times$ are screwed; each nozzle 23 which communicates with an inner cell such as 15, Fig. 2, is fitted with an opaque cover 24 having a sight-hole therein while the nozzles 23$^\times$ above the outer cells of the partitioned frame are each fitted with a glass cover 25 of the color desired.

The indicator case is fitted with an observation dial 26 which in the construction shown is mounted upon a plate of wood 27 and covered by a glass plate 28.

Above each of the outer nozzles 23$^\times$, a through aperture is formed in the wood plate 27, immediately above which the dial is cut away into desired shapes, as is indicated for instance at Fig. 6, where in the drawing the cut away portions of the dial are lined for clearness of illustration and are numbered 29, 30, 31, 32, 33, 34, 35 and 36, and when the dial 26 is in position these cut away portions will respectively be located above the cells correspondingly numbered at Fig. 1, and are located above the glass covered nozzles 23$^\times$ of those cells. The dial as has been stated, is cut away centrally and a short tube 37 is fitted extending above the glass cover 19 of the reflector structure 11 so that the glass cover 19 can be observed through the glass plate 28.

It is to be noticed that the dial 26 and its underlining of wood 27 is not cut away to form through apertures above the nozzles 23 of the inner cells 13 to 17.

When such an apparatus is utilized for indicating the position of a ship's rudder, the lamp in the chamber 15, Fig. 1, becomes illuminated by suitable switch mechanism, with which the present invention is not concerned, and reflects through a lateral window of the reflector chamber 11 which may show a reflected white light through the central aperture of the dial and indicate that the rudder is midships, while the other lamps will not be illuminated. When the rudder is moved to port, the lamp in the chamber 15 will be extinguished and a lamp in one of the chambers 29 to 32 will be illuminated and indicate the angle of the rudder as a particular direction, while the lamps in the chambers 13 and 16 will also be illuminated and reflect through red glass windows of the reflector chamber and show a red light indicating as a general direction that the rudder is to port; two lamps in the chambers 13, 16 are illuminated simply as a precautionary measure so that should one of the lamps be damaged the other one would still answer the purpose.

When the rudder is moved over to starboard, the lamps in the chambers 14 and 17 would be illuminated and show through the central aperture by a green color the general direction of the rudder, while one of the lamps in the chambers 33 to 36 would be illuminated to give the particular direction as to the angle at which the rudder has been moved to starboard.

Figure 7:
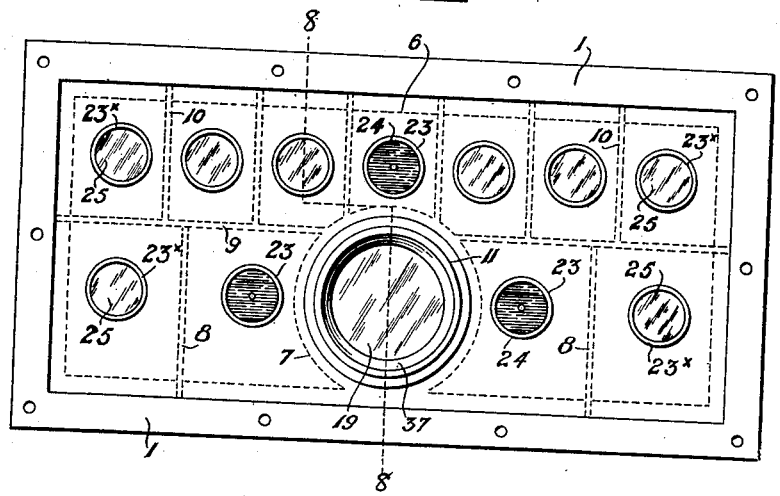
Fig. 7 is a plan view of an indicator case and Fig. 8 is a vertical cross section on the line 8—8 of Fig. 7, showing a modified construction varying only in the fact that the parts are arranged and formed to constitute a rectangular indicator case instead of a circular one as previously illustrated.
Figure 8:
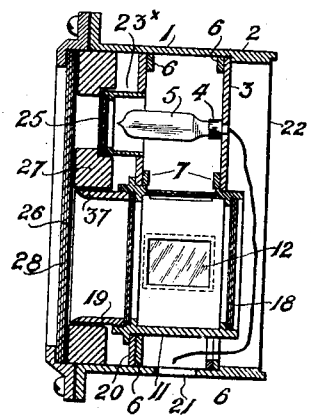

Figs. 7 and 8 simply illustrate changed dispositions of the parts already described, and in these figures the parts are sufficiently indicated by being marked with reference numerals corresponding to those of similar parts at Figs. 1 to 6.

What I claim as my invention and desire to secure by Letters Patent is:—

1. An indicator case for electrical signaling on ships and other vessels; comprising an inclosing case, a dial fitted to said case, said dial having a principal aperture the illumination of which serves to indicate general direction, and said dial having a plurality of subsidiary apertures the illumination of each of which serves to indicate some specific particular, a reflector chamber structure located within said case beneath said principal dial aperture, said structure having a transparent top and having a plurality of lateral windows each glazed with transparent material of differing colors, a cellular structure within said case having cells adjacent to said reflector chamber structure said cells having openings communicating with said windows of said reflector chamber structure, electric lamps in said cells the light rays from one or other of which pass through said windows into said reflector chamber structure and by reflection illuminate the principal aperture of said dial in accordance with the color of said window through which said light rays pass, said cellular structure having a closed cell located beneath each subsidiary aperture of said dial, each of said cells having an aperture immediately beneath said subsidiary apertures of said dial, a glass plate of a desired color to close said aperture of each cell beneath said subsidiary aperture of said dial, and an electric lamp in each cell beneath each subsidiary aperture of said dial the light rays from said electric lamps passing through the colored glass plates and illuminating the subsidiary apertures aforesaid, whereby general direction is indicated by reflection through said principal aperture of said dial and particular direction is indicated by light rays passing through one or other of said subsidiary apertures of said dial.

2. An indicator case for electrical signaling on ships and other vessels; comprising an inclosing case, a dial fitted to said case, said dial having a principal aperture and having a plurality of subsidiary apertures, a lower plate fixed within said case to form a diaphragm, a frame having vertical partitions located upon said lower plate, an upper cover plate located upon said frame to constitute with said partitioned frame and said lower plate a plurality of cells, an open topped reflector chamber structure located beneath said principal aperture of the said dial and fitting within an aperture in said upper cover plate and within said partitioned frame, said reflector chamber structure having a plurality of lateral windows each glazed with transparent material of different colors, said cells formed between said upper and lower cover plates and surrounding said reflector chamber structure having openings communicating with windows of said reflector chamber structure, electric lamps in said cells fixed to said lower plate the light rays from one or other of which is adapted to illuminate by reflection the principal aperture of said dial, said partitioned frame having also a subsidiary cell beneath each subsidiary aperture of said dial, said upper cover plate having a plurality of apertures communicating with said subsidiary cells, a transparent cover of the desired color fixed in each of said apertures and electric lamps in said subsidiary cells to respectively illuminate said subsidiary apertures of said dial.

3. An indicator case for electrical signaling on ships and other vessels; comprising an inclosing case, a dial fitted to said case, said dial having a principal aperture and having a plurality of subsidiary apertures, a lower plate fixed within said case to form a diaphragm, a frame having vertical partitions located upon said lower plate, an upper cover plate located upon said frame to constitute with said partitioned frame and said lower plate a plurality of cells, sockets fixed in and extending through said lower plate, an electric lamp detachably fixed in the upper part of each of said sockets above said lower plate said lamps being located in said cells, electric conductors passing through the wall of the inclosing case and connected respectively to said lamp carrying sockets beneath said lower plate, a bottom plate closing the base of the case, an open-topped reflector chamber structure located beneath said principal aperture of said dial and fitting within an aperture in said cover plate and within said partitioned frame, said reflector chamber structure having a plurality of lateral windows each glazed with transparent material of different colors, said cells formed between said upper and lower cover plates and surrounding said reflector chamber structure having openings communicating with said windows of said reflector chamber structure to permit the light rays from one or other of the lamps in said surrounding cells to illuminate by reflection the principal aperture of said dial, said partitioned frame having also a subsidiary cell beneath each subsidiary aperture of said dial, said upper cover plate having a plurality of apertures communicating with said subsidiary cells, and a transparent cover of the desired color fixed in each of said apertures through which the light rays from the lamps in said cells can pass to respectively illuminate said subsidiary apertures of said dial.

4. An indicator case for electrical signaling on ships and other vessels; comprising an inclosing case, a dial fitted to said case, said dial having a principal aperture and having a plurality of subsidiary apertures, a lower plate fixed within said case to form a diaphragm, a frame having vertical partitions located upon said lower plate, an upper cover plate located upon said frame to constitute with said partitioned frame and said lower plate a plurality of cells, a substantially cylindrical reflector chamber structure open at the top and the base, a light reflecting disk fitted into and closing the base and an opal glass cover closing the top of said reflector chamber, said reflector chamber being located beneath said principal aperture of said dial and fitting within an aperture in said upper cover and within said partitioned frame, said reflector chamber structure having a plurality of lateral windows each glazed with transparent material of different colors, said cells formed between said upper and lower cover plates and surrounding said reflector chamber structure having openings communicating with said windows of said reflector chamber structure, electric lamps in said cells fixed to said lower plate the light rays from one or other of which is adapted to illuminate by reflection the principal aperture of said dial, said partitioned frame having also a subsidiary cell beneath each subsidiary aperture of said dial, said upper cover plate having a plurality of apertures communicating with said subsidiary cells a transparent cover of the desired color fixed in each of said apertures, and electric lamps in said subsidiary cells to respectively illuminate said subsidiary apertures of said dial.

5. An indicator case for electrical signaling on ships and other vessels; comprising an open-ended cylindrical case, a glass cover on one end thereof, a dial fitted beneath said glass cover, said dial having a principal aperture and an annularly arranged plurality of subsidiary apertures, a lower plate fixed within said case to form a diaphragm, a frame having vertical partitions radiating from a central opening therein and divided by other vertical partitions intermediate between said central space and the periphery of said frame, said frame being located upon said lower plate, an upper cover plate having a central aperture and located upon said frame to constitute with said partitioned frame and said lower plate a plurality of cells, an open-topped reflector chamber structure located in the central aperture of said frame, a reflecting plate in the base of said reflector chamber structure said reflector chamber structure having a plurality of lateral glass windows of different colors, said cells formed between said upper and lower cover plates and said frame and surrounding said reflector chamber structure having openings communicating with said windows of said reflector chamber structure, electric lamps in said cells to illuminate by reflection the principal aperture of said dial by passing through the windows of said reflector chamber structure, a cell beneath each subsidiary aperture of said dial, said upper cover plate having an aperture communicating with each subsidiary cell, an electric lamp in each subsidiary cell capable of insertion or removal through said aperture, a transparent cover of the desired color for each aperture communicating with each subsidiary cell, and means for detachably fixing said transparent covers in position beneath the annularly arranged subsidiary apertures of said dial.

In witness whereof I have hereunto set my hand in the presence of two witnesses.

RODOLPH STUART O'NEIL.

Witnesses:
 THOMAS WILLIAM ROGERS,
 WILLIAM ANDREW MARSHALL.